Figure 1:
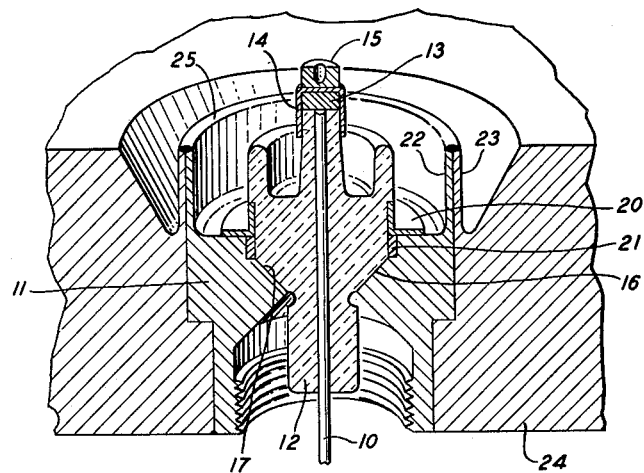

Jan. 16, 1962   L. RONGVED   3,017,452
HIGH PRESSURE SEALS FOR LEAD-IN CONDUCTORS
Filed Dec. 23, 1958   2 Sheets-Sheet 1

INVENTOR
L. RONGVED
BY John C. Morris
ATTORNEY

Jan. 16, 1962  L. RONGVED  3,017,452
HIGH PRESSURE SEALS FOR LEAD-IN CONDUCTORS
Filed Dec. 23, 1958  2 Sheets-Sheet 2

INVENTOR
L. RONGVED
BY John C. Morris
ATTORNEY

3,017,452
HIGH PRESSURE SEALS FOR LEAD-IN CONDUCTORS

Leif Rongved, New Providence, N.J., assignor to Bell Telephone Laboratories, Incorporated, New York, N.Y., a corporation of New York
Filed Dec. 23, 1958, Ser. No. 782,547
1 Claim. (Cl. 174—152)

This invention relates to high pressure seals for lead-in conductors and, more particularly, to metal-to-ceramic or metal-to-sapphire coaxial lead-in seals for making connections between an undersea cable and its included repeaters, equalizers and like appurtenances.

Undersea cable systems including repeaters at intervals require repeater housings of a larger diameter than that of the cable, which housings and appurtenances must be adequately sealed against ocean bottom pressures. Moreover, continuous electrical connection throughout the system must be adequately maintained with particular note to insulation integrity. Glass-to-metal seals have been used in this connection heretofore. A rigid seal of this type has been proposed in Patent No. 2,676,197 to W. T. Read, Jr., et al., issued April 20, 1954. It has been found desirable in prior systems to protect the rigid seal from very high pressures with a "soft" or flexible seal, for example, as disclosed in Patent No. 2,261,613 to W. M. Bishop, issued April 4, 1941.

An object of this invention is to improve the noted rigid type of seal, whereby to render such a seal capable of withstanding very high pressures.

A further object of this invention is to improve and facilitate the sealing of the housings of ocean bottom repeaters and the like to undersea cable.

In accordance with an illustrative embodiment of this invention, a high pressure coaxial lead-in comprises an annular metal member or outer conductor, which may be an integral part of a repeater housing or may be bonded thereto, as by welding. This member also may be denoted as a closure ring. The seal proper actually comprises two like seals, one between a centrally orificed, generally cylindrical ceramic body and the noted member or outer conductor, and the other between a central metallic conductor and the ceramic body. In each individual seal, two adjacent portions of the metal and the ceramic have intimately mating, interfacial surfaces held together primarily by differential pressure. The metal and the ceramic are additionally joined by a flexible metal member bonded to both and bridging the interface therebetween.

It may be here noted that the interfacial portion of the seal is an adaption of a classic seal for high pressure chambers. For example, in a high pressure chamber, one wall may include an orifice covered by a rigid block, such as a cylinder. The mating surfaces of the wall and the block are desirably perfect and, thus, in perfect contact. Due to the presence of the orifice, the pressure at the surrounding interface is greater than the pressure on the chamber walls and on the block. Thus, ideally the chamber is sealed at the interface and the greater the differential pressure, the better the seal.

In actual practice, the interfacial contact in devices of the kind noted is not perfect and is insufficient to seal out media, such as gases including water vapor. However, the addition of the flexible metal member bonded to each part, as herein proposed, will provide such a seal. Thus, the metal and the ceramic parts are free to move relative to each other while resisting substantially all of the pressures, while the flexible metal member takes care of the sealing, at the same time allowing the noted relative movement.

A particular sealed lead-in, according to an embodiment of this invention, comprises a generally cylindrical body of ceramic insulating material including an external annular shoulder and a through axial orifice. A central conductor is fitted within the orifice and sealed to the outer or high pressure end of the ceramic body by means of a rigid metal member or head tightly secured to the conductor and having a portion bearing on the annular zone of said body that surrounds the orifice. The rest of this seal comprises a pliable metal cap covering the member and interfacially bonded to the ceramic body. The body shoulder is fitted into a rigid metal closure ring and is held thereto by differential pressure. To complete this portion of the seal, a pliable metal ring is interfacially bonded to both the body and the closure ring. Thus, the joint between both the inner and the outer conductor and the ceramic is sealed by an unbonded, pressure mated interface between rigid bodies and a flexible bonded seal across the interface. This feature avoids high stress due to mismatch both in the elastic constant and the coefficient of expansion of the rigid bodies.

A feature then of this invention resides in a high pressure lead-in seal including inner and outer coaxial conductors separated by an insulator, which is sealed to each conductor by a composite seal comprising an unbonded interface oriented to withstand high differential pressure and a soft metallic seal across the high pressure end of the interface to complete the seal.

A further feature of this invention involves the use of a dense, hard material, such as a ceramic or sapphire, as the insulator of the new lead-in.

Other and further objects and features of this invention will appear more fully and clearly from the ensuing description of illustrative embodiments thereof taken with appended drawings, in which:

FIGS. 1, 2, 3 and 4 are respectively sectioned perspective views of four different embodiments of a high pressure lead-in seal in accordance with this invention.

The coaxial lead-in illustrated in FIG. 1 comprises an inner conductor 10 and an outer conductor 11 separated by a ceramic insulator 12. A head comprising a rigid, relatively flat cylinder or disc 13 of metal is secured to the high pressure end of the inner or center conductor 10 by brazing or welding. The inner face of the disc 13 and the mating face of the ceramic member 12 are made as flat as possible so as to provide as near a perfect fit as can be. This interface advantageously may be made metal-to-metal by metalizing the surface of the ceramic portion but there is no bonding between these faces.

A sealing cap 14 of flexible metal, such as platinum, fits over the disc 13 and is secured to a metalized portion of the periphery of the insulator 12 by brazing or the like. An outer cap 15 for making connection to a continuation of the inner conductor may be bonded to the sealing cap 14 in any suitable manner.

A tapered shoulder 16 on the insulator 12 is fitted into a mating annular shoulder 17 in the outer conductor 11. The metalized surface of the shoulder 16 and the surface of the shoulder 17 may be lapped together to provide a close fit. A sealing ring 20 is secured as by brazing to the outer surface of the insulator and to the high pressure side of the outer conductor 11. That portion of the outer conductor 11 at the end of the lapped interface adjacent to the sealing ring 20 may be undercut or counterbored to receive a filler ring 21. Although the ring 21 may contribute to the sealing action, its primary purpose is that of filling the counterbore which is made in the interest of accurate fitting and assembly, and to increase the resistance to impact that may be encountered in handling.

Those surface portions of the insulator 12 that are in contact with or in close proximity to metal details of the lead-in are metalized to aid in bonding, or fitting, or to present adjacent equipotential surfaces, as the case may be. The remainder of the ceramic surface is glazed to prevent surface contamination and consequent lowering of the breakdown voltage.

The outer conductor may have an annular flange or collar 22 for bonding to a similar flange 23 on the wall 24 of the vessel to be sealed. The wall 24 may be that of an undersea repeater interposed in a cable. The flanges 22 and 23 may be bonded by means of a weld 25 along their juxtaposed edges.

Figure 2:
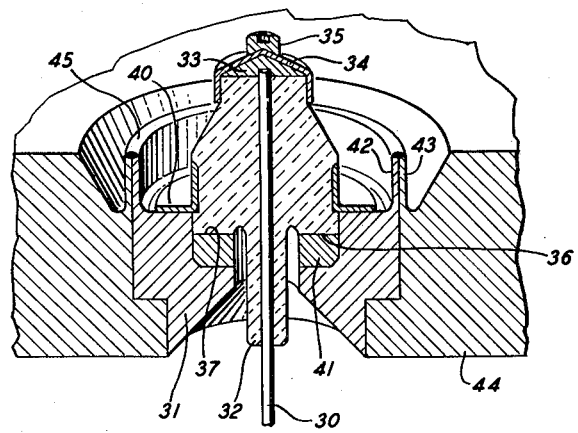

The lead-in seal shown in FIG. 2 is similar to that of FIG. 1 but with some differences in details. The disc or head 33, which is secured to the end of the inner conductor 30, has a conical outer face and the cap 34 is shaped to fit thereon. The outer cap 35 for continuing the inner conductor is also suitably shaped to fit the cap 34.

The ceramic body 32 has a flat shoulder, the surface 36 of which fits against the surface 37 of a metal insert 41 in the outer conductor 31. The insert 41 insures nearly uniform stress over the annular ceramic-metal interface. Specifically, it avoids high stress at the periphery of said interface because the insert is free to move with respect to the surrounding outer conductor 31. The surfaces 36 and 37 may be lapped together to provide a good fit. The flange 42 of the outer conductor 31 mates with a flange 43 of the wall 44 and may be welded thereto as at 45.

Figure 3:
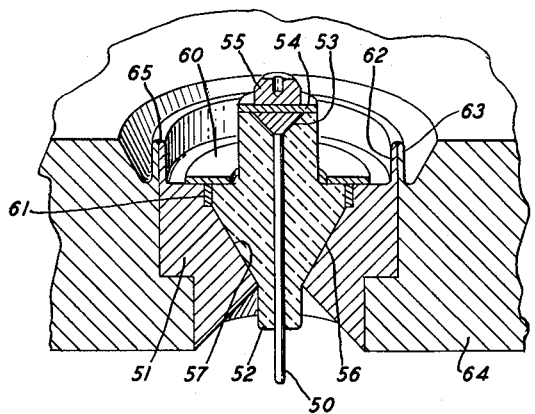

In the lead-in seal illustrated in FIG. 3, the disc or head 53 secured to the high pressure end of the inner conductor 50 is conical with the tapered surface fitted to but not bonded with a mating wall of a tapered orifice in the ceramic insulator 52. Because of the inclusion of the disc 53 within the body of the insulator, a flat disc 54 bonded to the exposed annular portion of the insulator serves as the flexible cap. A connecting cap 55 is bonded to the outside of the disc 54.

The insulator 52 has an intermediate tapered portion, the surface 56 of which mates with the surface 57 of the outer conductor 51. A filler ring 61, similar to the ring 21 of the FIG. 1 device, is used in this embodiment. The annular flanges 62 and 63 of the outer conductor 51 and the wall 64, respectively, are sealed together at their edges by means of a weld 65.

Figure 4:
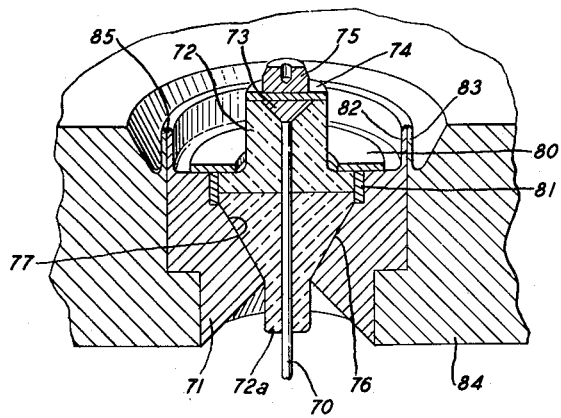

The lead-in shown in FIG. 4 is quite similar to the one shown in FIG. 3. The device of FIG. 4 has a two-part insulator comprising a sapphire portion 72 and a ceramic portion 72a. The ceramic portion is seated in the conical orifice of the outer conductor 71, the respective faces 77 and 76 being in intimate contact but not bonded.

The flexible metal ring 80 is sealed between the sapphire 72 and the outer conductor 71. Flanges 82 and 83 are sealed by a weld as at 85. The conical head or disc 73 secured to the outer or high pressure end of the conductor 70 is seated in a conical recess in the sapphire insulator 72 but is not bonded to this insulator. The soft metal sealing cap 74 and the connector or outer cap 75 are like their counterparts 54 and 55 in the device of FIG. 3. A sealing ring 81, similar to the rings 21 and 61 of FIGS. 1 and 3, respectively, is used in this embodiment.

If pieces of sufficient size are available, the whole insulator may be made of one piece of sapphire. Also, the ceramic 72a may be replaced by sapphire if desired. This assumes that there are no sufficiently large pieces of sapphire available to make the whole insulator. In view of the cost and the limited availability of sapphire, and of the ability of ceramic to serve the purpose, the combination of FIG. 4 may be used to considerable advantage.

Various hybridizations of the features of the illustrated embodiments obviously may be made without departing from the spirit and scope of this invention.

What is claimed is:

An insulated coaxial lead-in for making electrical connection through a wall that is subjected to a large difference of pressure on its opposite sides, said lead-in comprising a central conductor and an outer conductor, a generally cylindrical body of rigid insulating material separating said conductors and sealed to each by a first and a second seal respectively, the first seal comprising a rigid head of metal secured to the high pressure end of the inner conductor and resting on the corresponding end of the insulating body, and a cap of flexible metal covering said head and an adjacent portion of the body, said cap being bonded to and in continuous interfacial contact with both the head and the body; said second seal comprising an annular portion of the body resting on an annular portion of the outer conductor and sealed thereto by a flexible metal ring bonded to and in continuous interfacial contact with both the body and the outer conductor.

References Cited in the file of this patent

UNITED STATES PATENTS

| 1,110,573 | Recklinghausen | Sept. 15, 1914 |
| 2,838,596 | Foord | June 10, 1958 |

FOREIGN PATENTS

| 256,954 | Switzerland | Mar. 16, 1949 |

OTHER REFERENCES

Publication I: Jenny, "Soldered Ceramic-to-Metal Seals," Product Engineering, December 1947, pages 154 and 155.

Spurck et al.: Abstract of application Serial Number 136,194, published January 13, 1953, 66 O.G. 601–602.